US009813495B1

(12) United States Patent
Van Rensburg et al.

(10) Patent No.: US 9,813,495 B1
(45) Date of Patent: Nov. 7, 2017

(54) SYSTEMS AND METHODS FOR CHAT MESSAGE NOTIFICATION

(71) Applicant: RingCentral, Inc., Belmont, CA (US)

(72) Inventors: Christopher Van Rensburg, Foster City, CA (US); Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/476,919

(22) Filed: Mar. 31, 2017

(51) Int. Cl.
| | | |
|---|---|---|
| G06F 15/16 | (2006.01) | |
| H04L 29/08 | (2006.01) | |
| H04L 12/58 | (2006.01) | |
| H04L 29/06 | (2006.01) | |
| H04W 4/12 | (2009.01) | |

(52) U.S. Cl.
CPC .......... H04L 67/104 (2013.01); H04L 51/043 (2013.01); H04L 51/063 (2013.01); H04L 51/32 (2013.01); H04L 51/36 (2013.01); H04L 51/38 (2013.01); H04L 65/1066 (2013.01); H04W 4/12 (2013.01)

(58) Field of Classification Search
CPC ... H04L 67/104; H04L 51/043; H04L 51/063; H04L 51/32; H04L 51/36; H04L 51/38; H04L 65/1066; H04W 4/12
USPC ........................................................ 709/204
See application file for complete search history.

(56) References Cited

U.S. PATENT DOCUMENTS

| | | | | |
|---|---|---|---|---|
| 7,509,388 B2* | 3/2009 | Allen | .................. | G06Q 10/109 709/207 |
| 7,522,911 B2* | 4/2009 | Ung | ........................ | H04W 4/02 455/412.1 |
| 7,627,103 B2* | 12/2009 | Gao | ........................ | H04L 51/04 370/260 |
| 7,675,903 B2* | 3/2010 | Ozugur | ................... | H04L 51/04 370/352 |
| 7,779,079 B2* | 8/2010 | Nichols | ................. | G06Q 10/107 709/204 |
| 8,001,582 B2* | 8/2011 | Hulten | .................. | H04L 63/102 726/3 |
| 8,249,996 B1* | 8/2012 | Nallasivan | ............. | G06Q 10/06 705/321 |
| 8,363,644 B2* | 1/2013 | Kreitzberg | .............. | H04L 67/24 370/352 |
| 8,490,004 B2* | 7/2013 | Shuster | ................... | G06Q 30/02 715/747 |

(Continued)

OTHER PUBLICATIONS

SHirazi et al. "Large Scale Assessment of Mobile Notifications," Proceedings SIGCHI Conference on Human Factors in Computing Systems, May 1, 2014, pp. 305-3064.*

(Continued)

Primary Examiner — Melvin H Pollack
(74) Attorney, Agent, or Firm — Finnegan, Henderson, Farabow, Garrett & Dunner LLP

(57) ABSTRACT

Systems and methods are provided for facilitating a chat session. The systems and methods may include receiving chat data, and predicting a likelihood of interest of the user in the chat data, the prediction being based on a model of the user's behavior and information reflecting an attribute and an availability associated with a user. The systems and methods may further include providing a notification to a device associated with the user based on the determined likelihood of interest.

20 Claims, 12 Drawing Sheets

(56) References Cited

U.S. PATENT DOCUMENTS

| | | | | |
|---|---|---|---|---|
| 8,616,970 | B2* | 12/2013 | Ducheneaut | A63F 13/12 |
| | | | | 463/30 |
| 8,676,937 | B2* | 3/2014 | Rapaport | H04L 51/32 |
| | | | | 709/219 |
| 8,725,824 | B2* | 5/2014 | Brady | G06F 17/2785 |
| | | | | 709/204 |
| 8,751,636 | B2* | 6/2014 | Tseng | G06Q 30/0255 |
| | | | | 463/25 |
| 8,793,314 | B2* | 7/2014 | Spivak | G06Q 10/02 |
| | | | | 705/319 |
| 8,892,668 | B2* | 11/2014 | Ye | H04L 51/04 |
| | | | | 709/206 |
| 9,043,397 | B1* | 5/2015 | Ravichandran | G06Q 10/107 |
| | | | | 370/328 |
| 9,275,342 | B2* | 3/2016 | Vijayaraghavan | G06N 99/005 |
| 2007/0005754 | A1* | 1/2007 | Horvitz | H04L 67/22 |
| | | | | 709/224 |
| 2008/0189407 | A1 | 8/2008 | Charlton et al. | |
| 2012/0272160 | A1* | 10/2012 | Spivack | G06Q 10/10 |
| | | | | 715/752 |
| 2013/0290451 | A1* | 10/2013 | Harik | H04L 51/12 |
| | | | | 709/206 |
| 2013/0326375 | A1* | 12/2013 | Barak | H04L 65/403 |
| | | | | 715/758 |
| 2014/0156746 | A1* | 6/2014 | Wheatley | H04L 67/22 |
| | | | | 709/204 |
| 2014/0222926 | A1* | 8/2014 | Allen | G06F 17/30702 |
| | | | | 709/204 |
| 2014/0229614 | A1* | 8/2014 | Aggarwal | H04M 3/2227 |
| | | | | 709/224 |
| 2014/0236953 | A1* | 8/2014 | Rapaport | G06Q 10/10 |
| | | | | 707/740 |
| 2014/0244744 | A1* | 8/2014 | Lyren | G06Q 50/01 |
| | | | | 709/204 |
| 2014/0280915 | A1* | 9/2014 | Nemer | G06Q 30/0214 |
| | | | | 709/224 |
| 2015/0058324 | A1* | 2/2015 | Kauwe | G06Q 50/01 |
| | | | | 707/722 |
| 2015/0163189 | A1* | 6/2015 | Proctor | H04L 51/32 |
| | | | | 715/753 |
| 2016/0255034 | A1* | 9/2016 | Yuan | H04L 51/32 |
| 2016/0255082 | A1* | 9/2016 | Rathod | H04L 63/10 |
| 2016/0277351 | A1* | 9/2016 | Wang | H04L 51/32 |
| 2016/0315902 | A1* | 10/2016 | Silva | H04L 67/306 |
| 2017/0091194 | A1* | 3/2017 | Spiegel | G06F 17/3053 |
| 2017/0093967 | A1* | 3/2017 | Grosz | H04L 67/1044 |
| 2017/0111701 | A1* | 4/2017 | Tseng | H04N 21/4788 |
| 2017/0134919 | A1* | 5/2017 | Nordstrom | H04W 4/206 |
| 2017/0142051 | A1* | 5/2017 | Spivack | H04L 51/12 |

OTHER PUBLICATIONS

Fitzpatric et al. "Supporting Public Availability and Accessibility with Elvin: Experiences and Reflections," Computer Supported Cooperative Work, vol. 11, Issue 3-4, Sep. 2002, pp. 447-474.*

* cited by examiner

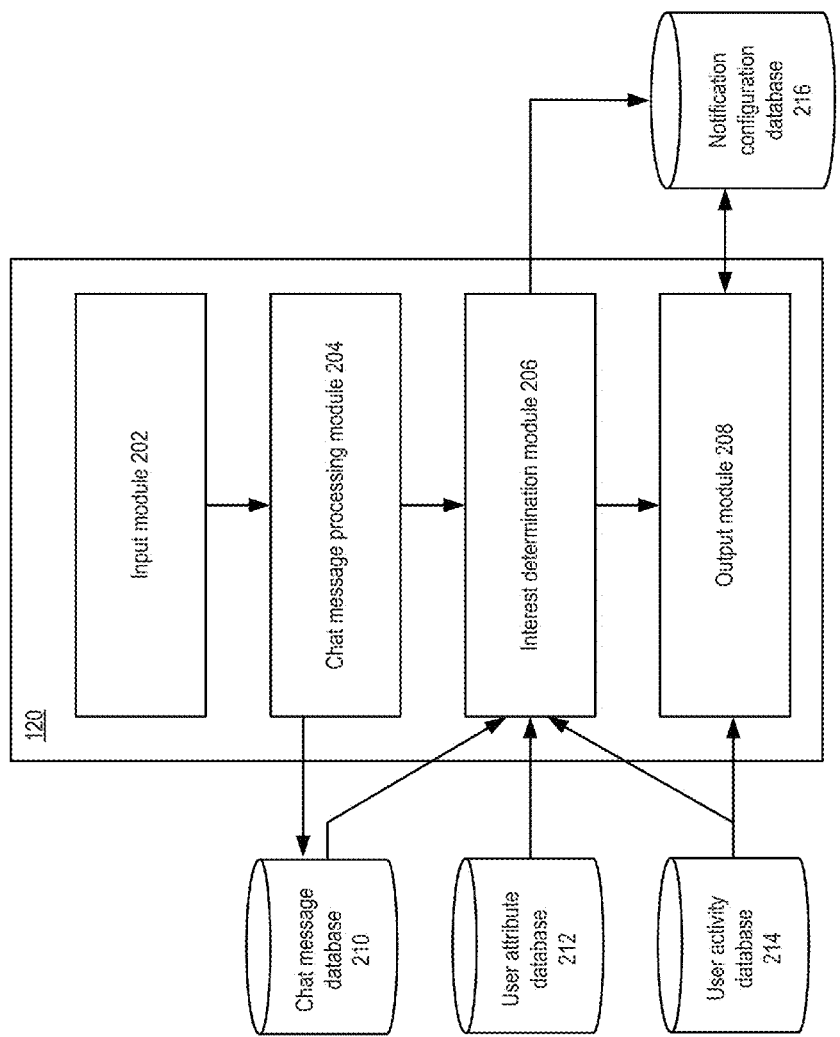

| User ID | Time stamp | keywords |
|---|---|---|
| 10003 | 1/18 at 2:00 pm | "a poem" "I wrote recently" |
| 10002 | 1/18 at 2:02 pm | "Not interested" "poem" "want" "cooking recipe" |
| 10001 | 1/18 at 3:00 pm | "Jason" "Jackie" "secret recipe" |

| User ID | Interested keywords | Disinterested keywords | Last updated |
|---|---|---|---|
| 10003 | "cooking" "recipe" "poem" | "secret" | 1/12 at 3:00 pm |

| User ID | 10003 |
|---|---|
| Date/Time | Activities |
| 1/13, at 1:30 pm | Access web pages related to cooking recipe — 242 |
| 1/13, at 1:35 pm | Access chat application — 244 |
| 1/13, at 2:05 pm | Cell phone screen disabled — 246 |
| 1/13, at 2:06 pm | Assess chat application — 248 |
| 1/13, at 6:00 pm | Cell phone starts hands-free mode — 250 |

| User ID | 10003 | | | | |
|---|---|---|---|---|---|
| Notification identifier | Notification type | Output criteria | Exception | Effective duration | Status |
| A | Email | 60 > Interest score >= 50; Availability score > 20 | Message includes the words "Jason" and "Jackie" | Ends at chat session | Enabled |
| B | Pop-up | 70 > Interest score >= 60; Availability score > 40 | Message includes the words "Jason" and "Jackie" | Ends at chat session | Enabled |
| C | Vibration | 80 > Interest score >= 70; Availability score > 60 | None | Ends with a change of topic | Disabled |
| D | Ring tone | Interest score >= 80; Availability score > 80 | None | Ends with a change of topic | Disabled |
| E | Private disinterest notification | Interest score < 20; | None | Forever | Enabled |
| F | Public disinterest notification | Interest score < 10; | None | Forever | Enabled |

SYSTEMS AND METHODS FOR CHAT MESSAGE NOTIFICATION

FIELD

The present disclosure relates to the field of telecommunications, and more specifically, to notification systems used in, for example, chat applications.

BACKGROUND

Communication software, such as a chat application, provides a platform for multiple users to communicate with each other remotely. The communication can be in different formats, and can be conducted either in a real-time mode, or in an off-line mode. For example, a user can use a chat application to generate a chat message that includes, for example, texts, picture, video, audio, etc., in a chat session. That chat message can be accessed by another user in real-time, or at a later time. In some cases, the intended recipient may access the chat message after receiving a notification about the chat message.

SUMMARY

The present disclosure enables chat message prioritization using notification. Such an arrangement arises from the realization that a user may wish to receive notifications about chat messages that are important and/or interesting to the user, but not receive notifications about chat messages that are neither important nor interesting to the user. Moreover, typically a degree of importance of a chat message to a user, as well as a likelihood of interest of the user in that chat message, may depend on the user's availability. For example, if a user is unavailable to respond to a chat message, he or she may wish to avoid being notified about the chat message, or wish to be notified in a less intrusive way, unless that chat message is of great importance or of great interest to the user. Therefore, it is advantageous to customize the transmission of a notification to a user about a chat message, based on a perceived likelihood of the user's interest in the content of the chat message, as well as the user's availability. However, traditional chat applications do not provide capabilities for such customizations. As a result, in one extreme a user may be inundated with too many notifications whereby he or she may ignore the notifications altogether or even feel compelled to disable the notification feature of the chat application. In another extreme, the user may not receive any notifications at all. In both cases, the user may be forced to skip accessing chat messages that are important or of interest to the user. As a result, user experience will be degraded.

Consistent with disclosed embodiments, a method of facilitating a chat session is provided. The method can be performed on a device enabled to provide the chat session, and comprises: receiving chat data; predicting a likelihood of interest of the user in the chat data, the prediction being based on a model of the user's behavior and information reflecting an attribute and an availability associated with a user; and providing a notification to a device associated with the user based on the determined likelihood of interest.

Consistent with another disclosed embodiment, an apparatus for conducting a chat session is provided. The apparatus comprises one or more memories having stored thereon computer-executable instructions, and one or more hardware processors configured to execute the stored instructions to: receive chat data, and predict a likelihood of interest of the user in the chat data, the prediction being based on a model of the user's behavior and information reflecting an attribute and an availability associated with a user. The one or more hardware processors are further configured to execute the stored instructions to provide a notification to a device associated with the user based on the determined likelihood of interest.

Consistent with yet other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings:

FIGS. 2A-2E are block diagrams for an example of a chat application described in FIGS. 1A-1B.

DETAILED DESCRIPTION

The disclosed embodiments concern notification systems and methods for chat messages. With the disclosed embodiments, a system can output a notification about a new chat message to a user device operated by a user. The system can determine to output the notification, as well as the form of the notification, based on a likelihood of the user's interest in the new chat message, and/or the user's availability. As a result, a user can be notified about a new chat message that he or she is likely to be interested in, or messages that are important to the user. Moreover, the user will be notified about the new chat message when he or she is available to access the new chat message. Such arrangements enable the user to manage access to the new chat messages more efficiently and effectively, thereby improving user experience.

Other features and advantages of the present embodiments are discussed in further detail below with respect to the figures.

Figure 1A:
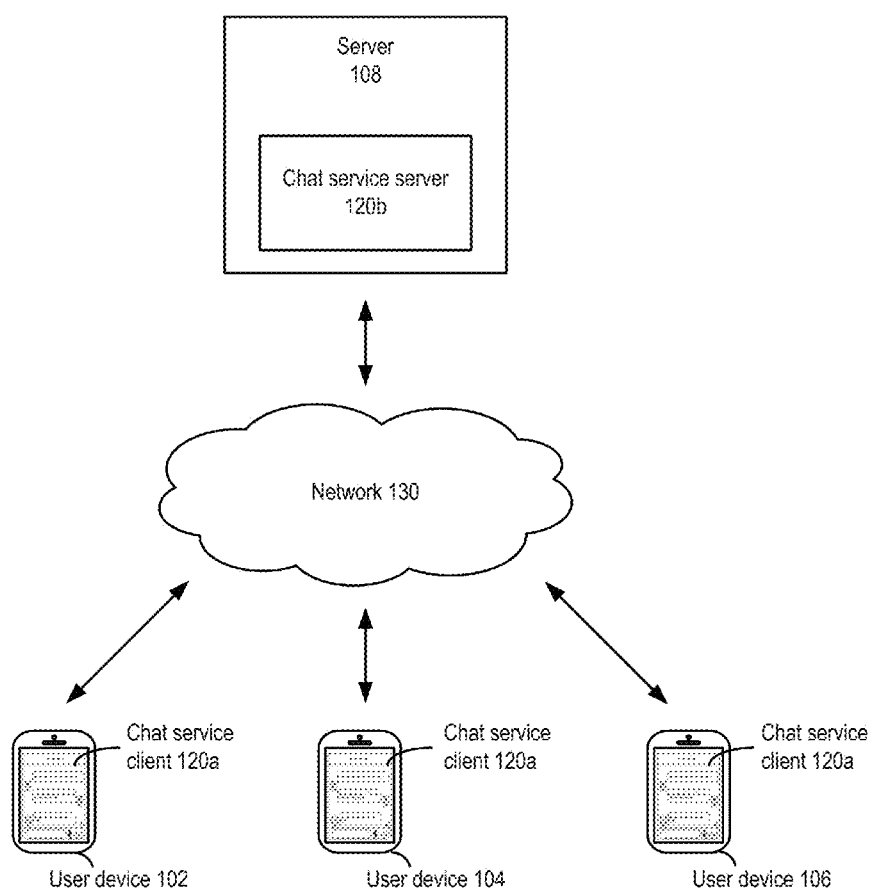
FIGS. 1A-1B are diagrams of an example of a system environment for a chat session, consistent with the disclosed embodiments.

FIG. 1A is a diagram of an example of a system environment 100 for chat service, consistent with embodiments of the present disclosure. As shown in FIG. 1A, a chat service can be provided via each of user devices 102, 104, and 106 (e.g., smart phones), to provide a chat session that allows multiple users to communicate via chat messages remotely over network 130 via a server 108. The chat service can be provided by a chat application 120, which includes a chat service client 120a, and a chat service server 120b. Chat service client 120a can be installed and operate on user devices 102, 104, and 106, whereas chat service server 120b can be installed and operate on server 108.

It should be noted that the term "user" is being used in the interest of brevity and may refer to any of a variety of entities that may be associated with a subscriber account such as, for example, a person, an organization, an organizational role within an organization, a group within an organization, etc. The user devices can include a variety of devices, such as mobile phones, landline phones, Voice over IP (VoIP) phones, gateways, audio and/or video conferencing devices, gaming consoles, personal computers, laptops, smartwatches, or tablets. The user devices may be installed with software that support conferencing, such as web browsers, web-based real time communications (WebRTC) client application, a mobile app, or the like.

Figure 1B:
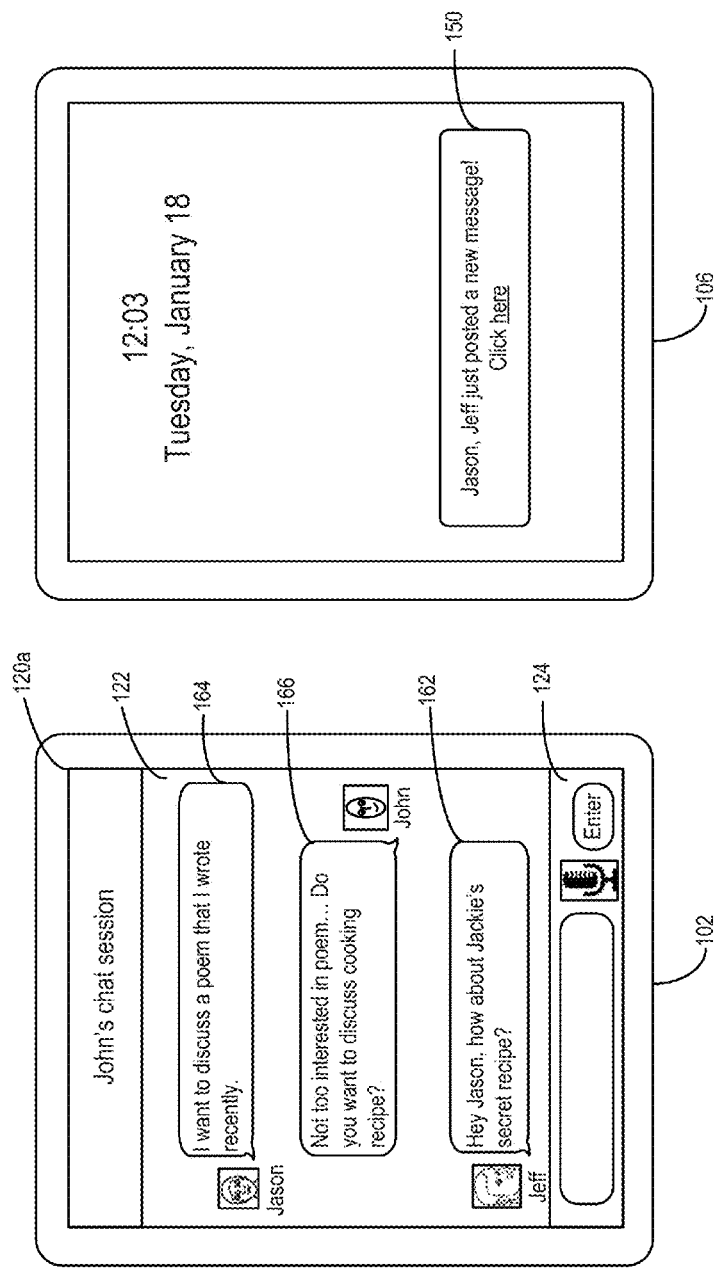

Reference is now made to FIG. 1B, which illustrates examples of operations of chat service client 120a, consistent with embodiments of the present disclosure. As shown in FIG. 1B, chat service client 120a may operate on a user device (e.g., user device 102) to provide a display interface 122. Display interface 122 can display the content of chat messages including, for example, text, image, and/or video contents. Chat service client 120a also provides an input interface 124 for inputting chat messages. The chat messages can include text data, and may be embedded with image, video, audio files, etc.

Moreover, as shown in FIG. 1B, chat service client 120a may also provide a notification 150 on another user device (e.g., user device 106), to bring to a user's attention about a new chat message in the chat session. Chat service client 120a may provide notification 150 based on a determination (e.g., by chat service server 120b) that the user is not accessing user device 106 for chat services. As an illustrative example, at a certain time point, chat service server 120b may receive, via chat service client 120a, a new chat message 162 from one of the users, Jeff, when the intended recipient, Jason, is away from his device (user device 106). With operation information provided by chat service client 120a (e.g., that user device 106 is in an idle state, that display interface 122 is not being displayed on user device 106, etc.), chat service server 120b can determine that Jason has not accessed new chat message 162. Chat service server 120b can then cause chat service client 120a to output notification 150 at user device 106, to notify Jason about new chat message 162. In some embodiments, chat service client 120a can also be notified about new chat message 162 and, based on the aforementioned operation information, determine that Jason has not accessed new chat message 162. Chat service client 120a then outputs notification 150 at user device 106, to notify Jason about the new chat message.

Notification 150 can come in different forms. For example, as shown in FIG. 1B, chat service server 120b (with chat service client 120a) can cause user device 106 to display notification 150 as a pop-up message. Moreover, notification 150 can be provided as an email, and transmit the notification to an email server which is accessible by the user. Further, chat service server 120b (with chat service client 120a) can also cause user device 106 to output notification 150 in other forms, such as by playing a ring tone, generating a vibration, etc., to draw the user's attention.

Each form of notification 150 can be associated with a predetermined degree of disturbance. For example, a notification that causes user device 106 to play a ring tone or to generate a vibration can be associated with the highest degree of disturbance. On the other hand, a pop-up message can be associated with a medium degree of disturbance, whereas an email can be associated with the minimum degree of disturbance. Moreover, the degree of disturbances for some forms of notification 150 (e.g., ring tone and vibration) can also be configured by, for example, adjusting a duration, an intensity, etc., associated with the notification.

Consistent with embodiments of the present disclosure, chat service server 120b can determine an interest score that reflects the likelihood of interest of the user in the new chat message, as well as based on the user's availability. In some embodiments, chat service client 120a may also determine the interest score based on information that reflects the user's interest and user's availability provided by chat service server 120b. If the interest score exceeds a certain threshold, which can indicate the user is likely to be interested in accessing the new chat message, chat service server 120b can provide notification 150 to a user device operated by the user, to bring to the user's attention about a new chat message. Chat service server 120b may also configure notification 150 to set a degree of disturbance based on the likelihood of user interest, as reflected by the interest score. For example, for relatively high likelihood of user interest, a notification that is associated with a higher degree of disturbance (e.g., playing a ring tone, generating a vibration, etc.) can be provided to the user device. In contrast, for relatively low likelihood of user interest, chat service server 120b can withhold the notification, or provide a notification that is associated with a lower degree of disturbance (e.g., an email notification).

Consistent with example embodiments of the present disclosure, chat service server 120b can extract content information from the new chat message, and then generate the interest score based on a comparison between the content information and attribute information of the user that reflects the user's interest. The content information can include, for example, keywords from the text content of chat messages, meta data and tags associated with a media file (e.g., image file, video file, audio file, etc.) embedded in the chat messages, generated descriptive data produced by computer analysis of a media file embedded in the chat messages (using technologies such as Computer Vision, Artificial Intelligence, and Machine Learning), etc. Moreover, the attribute information may include various information including, for example, keywords of interests of the user, a record of chat messages accessed or generated by the user, topics of interests of the user based on the user's browsing history and other online activities, etc. In some embodiments, chat service client 120a may also extract content information from the new chat message, and generate the interest score based on attribute information provided by chat service server 120b.

As an illustrative example, referring to FIG. 1B, chat service server 120b may extract keywords from the text of new chat message 162 (e.g., "Jason", "Jackie", "secret recipe", etc.). The attribute information of Jason may also indicate his preference for reading chat messages about any person named "Jackie" (e.g., because Jason's sister is named Jackie), or that he is interested in cooking. Chat service server 120b may determine a degree of correlation between the extracted keywords and the attribute information, to determine the interest score. If the interest score exceeds a predetermined threshold, chat service server 120b may determine that there is a high likelihood that Jason will be interested in accessing new chat message 162. Based on this determination, notification 150 can be provided on user device 106, operated by Jason, to notify Jason about the new chat message.

Consistent with example embodiments of the present disclosure, chat service server 120b may also determine an aggregate interest score that reflects the likelihood of interest of the user in the new chat message. The aggregate interest score can be determined based on a weighted average of a set of interest scores calculated from a set of prior and current activities of the user. Each interest score can represent a likelihood of user interest in the new chat message, based on the user's interest as reflected from a prior activity of the user. Each interest score can also be associated with a weight, with an interest score for a more recent activity being associated with a larger weight than an interest score for an earlier activity. By considering a set of activities for user interest determination, the determination can be based on a larger set of data samples, and the accuracy can be improved. Moreover, the aggregate interest score can also be more aligned with the user's most recent interest, which can further improve the accuracy of user interest determination.

As an illustrative example, referring to FIG. 1B, chat service server 120b may determine that Jason had recently browsed a webpage related to recipes. Based on this, chat service server 120b (or chat service client 120a, based on information provided by chat service server 120b) may determine a first interest score based on a correlation between the content of the webpages and new chat message 162. Chat service server 120b can also determine a second interest score based on a degree of correlation between new chat message 162 and Jason's attribute information. Assuming that Jason's attribute information is updated or generated prior to Jason browsing the webpages related to recipe, chat service server 120b can assign a larger weight to the first interest score than to the second interest score, to reflect that the more recent web browsing activity provides a better representation of Jason's most current interest. Therefore, even if the second interest score (associated with the attribute information) is relatively low and the first interest score (associated with Jason's chat message 164) is relatively high, the aggregate score may become above the threshold, notification 150 can be output as a pop-up message (or other forms of notifications with higher degree of disturbance) as a result.

Chat service server 120b may also determine a likelihood of user's interest in new chat message 162 based on other factors. For example, based on a determination that new chat message 162 is not a response to the user's prior chat message, chat service server 120b may determine that the user is unlikely to be interested in the new message. The determination that new chat message 162 is not a response to the user's prior chat message can be based on, for example, a sequence of chat messages in the chat session, and whether there is an interruption in the flow of discussion. In the example shown in FIG. 1B, chat service server 120b may detect that Jason's chat message 164 and new chat message 162 is separated by chat message 166 from John. Moreover, both John's chat message 166 and Jeff's new chat message 162 include common keywords (e.g., recipe) not found in Jason's chat message 162. Therefore, chat service server 120b may determine that John's chat message 166 has started a different discussion topic, and Jeff's new chat message 162 is a response to John's chat message 166, not a response to Jason's chat message 164. Based on this, chat service server 120b may determine that Jason is unlikely to be interested in new chat message 164, and withhold notification 150 as a result.

Moreover, the determination of likelihood of user's interest in the new chat message can also take into consideration the user's location, the user's availability, and a model of the user's behavior. As an illustrative example, at a specific time point, chat service server 120b may determine that Jason is at work, based on Jason's personal calendar information. As another example, at that specific time point, chat service server 120b may determine that Jason is driving on a roadway, based on the location information of user device 106 transmitted by chat service client 120a. In both cases, it can be determined that Jason is unavailable to check new chat messages, and notification 150 can be withheld, despite the interest score indicating that Jason is likely to be interested in the new chat message. Alternatively, notification 150 can be output in a different form (e.g., as an email notification), to reduce a degree of disturbance to Jason.

As another illustrative example, chat service server 120b may also determine, based on a history of Jason checking and responding to chat messages while at work, that Jason is available to check new chat messages. In that case, if the interest score exceeds the threshold, notification 150 may be output to bring to Jason's attention about the new chat message, despite the indication (e.g., based on Jason's personal calendar information) that Jason is at work.

Consistent with embodiments of the present disclosure, chat service server 120b may also allow exceptions or modifications to the aforementioned criteria for providing (or withholding) notification 150. For example, chat service server 120b can determine that any chat message that includes another user's name which is important to user (e.g., a VIP user), regardless of the content of the chat message (and the interest score associated with it). In the illustrative example shown in FIG. 1B, chat service server 120b may determine that new chat message 162 contains the word "Jason," and that notification 150 is to be output to Jason's user device 106 to notify him about new chat message 162, regardless of whether the new chat message has a low interest score. Such an arrangement may reflect that a message that calls for a user is likely to be important to the user, regardless of whether the user is interested in the content of the message.

As another example, chat service server 120b can also be configured to use a predetermined set of keywords for determining the interest score over a predetermined time period (e.g., within an hour), for a particular chat session, etc. After the predetermined time period expires, or after the chat session ends, chat service server 120b can cease using that predetermined set of keywords for determining the interest score. In some embodiments, the exceptions and configurations of criteria for interest score determination can be provided by the user as a part of user configuration.

Reference is now made to FIG. 2A, which illustrates examples of chat application 120, consistent with embodiments of the present disclosure. As shown in FIG. 2A, chat application 120 includes an input module 202, a chat message processing module 204, an interest determination module 206, and an output module 208. Some or all of these modules can be software modules. These components can also be split between chat service client 120a (hosted on a user device, such as user device 106) and chat service server 120b (hosted on a server, such as server 108). These components can also be a part of chat service client 120a or a part of chat service server 120b. Moreover, chat application 120 is also coupled with a chat message database 210, a user attribute database 212, and a user activity database 214, and a notification configuration database 216. These databases can be hosted on the same system that operates chat application 120, or hosted on a different system.

Input module 202 can receive data of a new chat message (e.g. new chat message 162) from, for example, input interface 124. The chat message may include text data, and can be embedded with image files, video files, audio files, etc. In a case where input module 202 is a part of chat service server 120b, input module 202 can also receive the chat message data via a network interface (not shown in FIG. 2A) transmitted from chat service client 120a of the user devices. Input module 202 can also receive other inputs from a target user device which is to receive a notification about the new chat message. The inputs may include, for example, an operation state of the target user device (e.g., whether the target user device is in an idle state, whether the target user device is displaying a chat session, etc.). Based on the operation state, input module 202 may determine that a user has not accessed the new chat message. Input module 202 can then transmit the new chat message data to chat message processing module 204 for processing.

Chat message processing module 204 can process the new chat message data to extract content information for determining a likelihood of user's interest in the new chat message. For example, chat message processing module 204 can perform natural language processing (NLP) on the text data included in the chat message. The processing may include, for example, morphological segmentation, part-of-speech tagging, etc. As a part of the processing, chat message processing module 204 may derive a set of keywords from the chat message data that are determined to best represent the information content of the chat message data. Moreover, if the new chat message is embedded with a media file (e.g., image, video, audio, etc.), chat message processing module 204 can also obtain the meta data of the media file or generate descriptive data for the media file by computer analysis of the media file using technologies such as Computer Vision, Artificial Intelligence, and Machine Learning. Chat message processing module 204 can then provide the processed data to interest determination module 206 to determine a likelihood of user interest in the chat message data.

Chat message processing module 204 can also store the processed data in chat message database 210. Chat message processing module 204 can also associate the processed data with other information. The information may include, for example, an identifier of the user who generated the chat message data, a time point at which the user generated the chat message data, etc. Chat message processing module 204 can also store the associated information in chat message database 210. Reference is now made to FIG. 2B, which illustrates an example of a data structure 220 of chat message database 210 that correspond to the chat messages illustrated in FIG. 1B. As shown in FIG. 2B, data structure 220 maps keywords extracted from chat messages 162, 164, and 166 with identifiers of users (user ID) who generated these chat messages. For example, keywords 222 extracted from new chat message 162 are associated with Jeff's user ID (10001), keywords 224 extracted from chat message 164 are associated with Jason's user ID (10003), and keywords 226 extracted chat message 166 are associated with John's user ID (10002). The keywords are also associated with time stamps that indicate a time and a date when the chat messages were generated. As to be discussed in more detail below, the information stored in data structure 220 can be used to determine whether a new chat message is a response to a user's prior chat message, and based on that, a likelihood of the user's interest in the new chat message.

After receiving the processed data (e.g., keywords, meta data, etc.) of a new chat message from chat message processing module 204, interest determination module 206 can determine the aforementioned interest score that reflects the likelihood of user interest in the new chat message. The determination of the interest score can be based on a degree of correlation between the processed data and user attribute information from user attribute database 212.

Reference is now to FIG. 2C, which illustrates an example of data structure 230 stored in user attribute database 212. Referring back ton FIG. 2A, user attribute database 212 can store a set of attribute information including, for example, a set of keywords that interests the user, a set of keywords that does not interest the user, etc. User attribute database 212 can also associate the set of keywords with a user identifier (user ID). In the example shown in FIG. 2C, the set of keywords are associated with user ID 10003 (Jason). The sets of keywords can come from various sources. For example, the sets of keywords can be provided by the user as a part of user configuration for chat software 120. The sets of keywords can also be provided by other software applications that keep track of the user's online activities, such as search queries, accessed web pages, etc.

Interest determination module 206 can determine a degree of correlation between the new chat message and the user attribute information based on various schemes, for determining a likelihood of user's interest. For example, to determine whether a notification is to be sent to a user with a particular user ID, as well as the form of the notification (e.g., a pop-up notification, an email notification, ring tone, etc.), interest determination module 206 may use the user ID to acquire a set of interested and disinterested keywords from user attribute database 212. Interest determination module 206 can determine a set of vectors representing the keywords extracted from the new chat message, and a set of vectors representing the interested and disinterested keywords acquired from user attribute database 212. Interest determination module 206 can then determine a first distance (e.g., cosine distance) between the vectors representing the new chat message and the interested keywords. Interest determination module 206 can also determine a second distance (e.g., cosine distance) between the vectors representing the new chat message and the disinterested keywords. The first distance can represent how closely related the new chat message is to topics of interest of the user, whereas the second distance can represent how closely related the new chat message is to topics that do not interest the user, with shorter distance reflecting closer relationship. Interest determination module 206 can then determine an interest score based on a combination of the first and second distances (e.g., a ratio between the first and second distances), such that the interest score is inversely proportional to the first distance and is proportional to the second distance.

Moreover, as discussed above, chat application 120 may determine an aggregate interest score based on a weighted average of a set of interest scores calculated from a set of prior and current activities of the user. Information about the set of prior and current activities can be stored and retrieved from user activity database 214. Reference is now made to FIG. 2D, which illustrates an example of data structure 240 stored in user activity database 214. As shown in FIG. 2D, user activity database 214 stores a log of activities, including activities 242-250, and associate the log with a user ID. Moreover, each of activities 242-250 is also associated with a date and a time. Interest determination module 206 can access user activity database 214 to obtain the log of activities, and determine a degree of correlation between the keywords extracted from the new chat message and each activity. In the example shown in FIG. 2D, based on the keywords "recipe" in both of the new chat message and activity 242, interest determination module 206 can determine that activity 242 is the most correlated to the new chat message among the log of activities.

After identifying activity 242 as the most correlated to the new chat message, interest determination module 206 can calculate a first interest score based on a relationship (e.g., cosine distance) between the keywords extracted from the new chat message, and keywords that represent activity 242. Moreover, interest determination module 206 can also calculate a second interest score based on, for example, cosine distances between the keywords extracted from the new chat message, and the set of interested and disinterested keywords from user attribute database 212, as discussed above. Interest determination module 206 can determine the aggregate score based on a weighted average between the first and second interest scores. Moreover, in the example shown in FIGS. 2C and 2D, interest determination module 206 may determine, based on the associated time stamps, that the user attribute information were updated prior to the occurrence of activity 242, and therefore activity 242 is more likely to reflect the user's recent interest. Based on this determination, interest determination module 206 can assign a relatively larger weight to the first interest score and a relatively smaller weight to the second interest score, to determine the aggregate interest score.

Moreover, as discussed above, chat application 120 can also take into consideration the user's location, the user's availability, and a model of the user's behavior, in determining the likelihood of user's interest in the new chat message. Consistent with embodiments of the present disclosure, interest determination module 206 can access the log of activities stored in user activity database 214 to predict the availability of a user, for determining whether to transmit a notification (and its form) at a particular time point. For example, referring to the example shown in FIG. 2D, based on activities 244 and 248 stored in data structure 240, interest determination module 206 may predict that Jason is available to access new chat messages at 1:35 pm and at 2:06 pm on a particular day. Moreover, based on activity 250, which indicates that Jason's device enters hands-free mode, interest determination module 206 may also predict that Jason is driving at 6:00 pm on a particular day, and is unavailable to access new chat messages at that time point.

In some embodiments, rather than or in addition to making a binary determination about whether a user is available or unavailable, interest determination module 206 can also determine an availability score that reflects a degree of likelihood that the user is available to access the new chat messages. For example, interest determination module 206 can consider a window of several days, determine how many times the user accessed (or did not access) the chat application at a given time on those several days, to determine the degree of likelihood of availability.

Output module 208 can determine whether to transmit a notification for a new chat message, and what form, based on the interest score and the user's availability information determined by interest determination module 206. Output module 208 can also access a set of rules for notification generation from notification configuration database 216, and apply the set of rules to the interest score and the availability information, to determine the notification.

Reference is now made to FIG. 2E, which illustrates an example of data structure 260 stored in notification configuration database 216. As shown in FIG. 2E, data structure 260 stores a set of rules for outputting a notification about a new chat message to a particular user (e.g., Jason, with user ID 10003). Each of the set of rules can be associated with a particular type of notification. Each rule can also include a combination of sub-rules. The sub-rules may include, for example, output criteria, exception, effective duration, and a status that indicates whether the rule is enabled.

In the example shown in FIG. 2E, chat application 120 may support six different types of notifications. Some of the notifications are directed to bring to a user's attention about a new chat message. Such notifications may include a pop-up notification (such as notification 150 shown in FIG. 1B), an email notification, a ring tone, and a vibration. Each of these notifications is associated with one or more output criteria, which generally tie the degree of disturbance of the notification to a likelihood of user's interest. For example, as shown in FIG. 2E, for an interest score between 50 and 59 (e.g., out of 100), an email notification can be output. For an interest score between 60 and 69, a pop-up notification can be output. For an interest score between 70 and 79, a notification in the form of vibration can be output. And for an interest score that equals or exceeds 80, a notification in the form of a ring tone can be output.

Moreover, the determination to output some of the aforementioned notifications may also be based on the availability score, such that which the degree of disturbance of the notification is also tied to the availability of the user. For example, the pop-up notification can be output when the availability score exceeds 40 (out of 100). The vibration can be output when the availability score exceeds 60, whereas the ring tone can be output when the availability score exceeds 80. Output module 208 may also determine not to output a particular type of notification when the availability score is below the requisite threshold, despite the interest score falling within the requisite range. In such a case, output module 208 may determine to output a notification that has a lower availability requirement. For example, if output module 208 determines not to output a pop-up notification, despite the interest score falling within the range between 60 and 69, it may determine to output an email instead. Likewise, output module 208 may replace a vibration notification with a pop-up notification (or an email notification), a ring tone with a vibration notification (or a pop-up notification, or an email notification), etc., based on the availability score.

Chat application 120 may also support notifications that are directed to other users, such as the user who generates a new chat message, or to other users in a chat session. For example, in the example shown in FIG. 2E, if the interest score for a new chat message is below a certain threshold (e.g., 20 out of 100), output module 208 may output a private disinterest notification to a user device associated with the user who generated the new chat message, to let that user know that there is at least one user in the chat session who is not interested in the new chat message. If the interest score is lower than another threshold (e.g., below 10), output module 208 may output a public disinterest notification in the chat session. The public disinterest notification can be in the form of a chat message in that chat session, where every participant to the chat session can access the public disinterest notification. With such arrangements, other users can be notified about another user's disinterest in a particular topic, keywords, etc. As a result, these users may change their topics of discussions in the chat session, after receiving the disinterest notifications.

Moreover, the rules stored in data structure 260 can also include exceptions, effective duration, and statuses. The exceptions may define one or more exceptions for outputting a notification despite the interest score (and the availability score for some notifications) not meeting the requisite threshold listed in the output criteria. For example, in the example shown in FIG. 2E, an email notification or a pop-up notification can be output if the new chat message includes the words "Jason" and "Jackie," regardless of whether the interest score and the availability score satisfy the requisite thresholds listed in the output criteria associated with these notifications.

Moreover, the effective duration may define a duration when the rule for outputting a particular notification is effective. Beyond that duration, the rule for outputting that notification may expire, and can be superseded by other rules. In the example shown in FIG. 2E, the rule for outputting email notification expires at the end of a chat session, while the rule for outputting a vibration notification expires when there is a change of discussion topic during the chat session. For example, referring back to FIG. 2B, interest determination module 206 may determine, based on the keywords and the sequence of chat messages, that a new discussion topic (e.g., cooking recipe) has been started in place of an earlier discussion topic (e.g., poem). In that example, interest determination module 206 may generate a low interest score for new chat message 162 (which is directed to a recipe) and cause output module 208 to withhold notification 150. Moreover, interest determination module 206 may also transmit an indication of change of topic to output module 208 to disable the rules for vibration and ring tone notifications, as shown in FIG. 2E. As a result, both types of notifications will not be output to a user device, until notification configuration database 216 receives a new set of rules for these notifications.

The rules stored in notification configuration database 216 can be updated based on a user's configuration. For example, a user can, via a user device, create or update a record of rules for outputting each type of notification, and specify the exceptions and effective durations for each notification. The user can also selectively enable or disable some or all of these notifications in the record of rules. The user device can then transmit the record of rules to an account database (not shown in the figure), which can store the rules at notification configuration database 216 and link the rules to other account information of the user.

Figure 3:
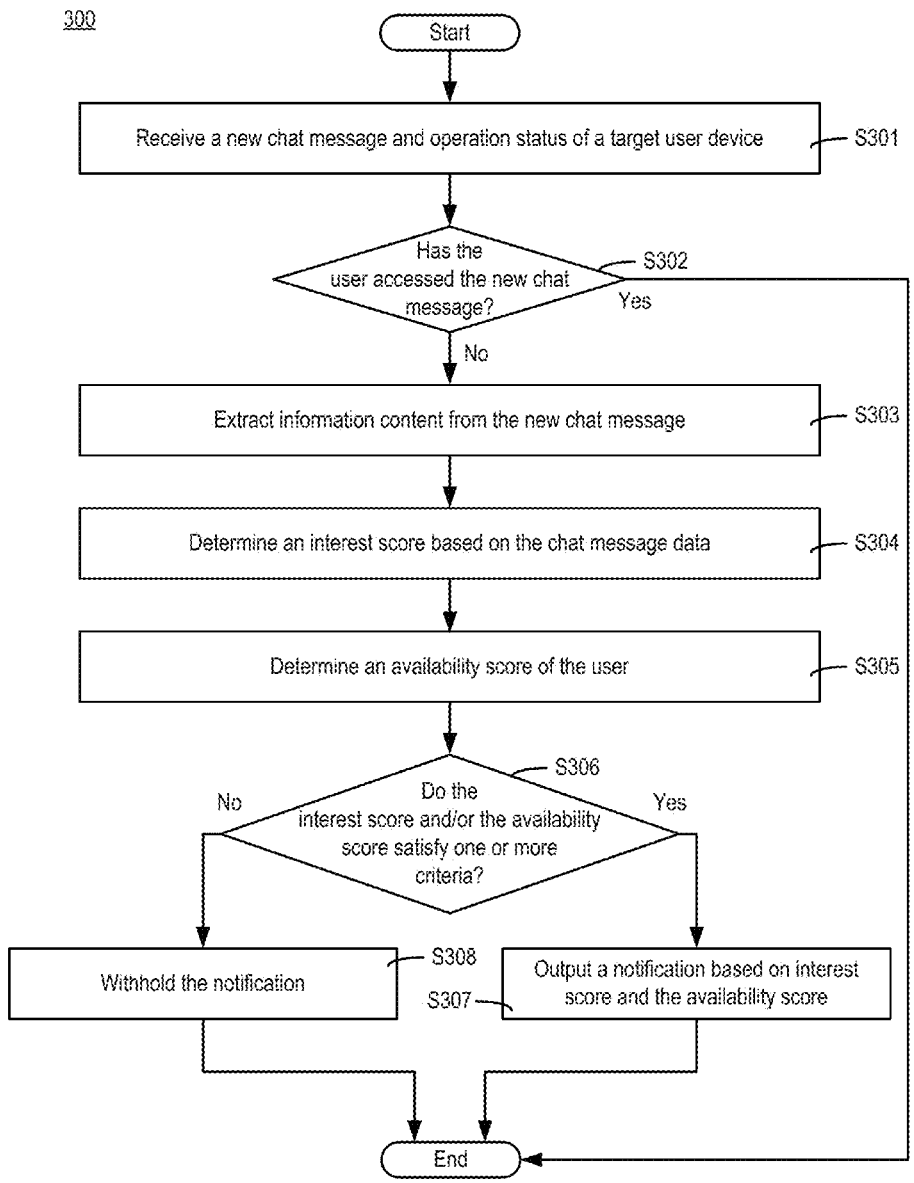
FIG. 3 is a flow chart used to explain an example of a method for facilitating a chat session, consistent with disclosed embodiments.

FIG. 3 is a flow chart used to explain an example of a method 300 for facilitating a chat session, consistent with disclosed embodiments. The steps associated with this example process can be performed by the components of, for example, FIG. 2A. In the following description, reference is made to certain components of FIG. 2A for purposes of illustration. It will be appreciated, however, that other implementations are possible and that components other than that illustrated in FIG. 2A can be utilized to implement the example method of FIG. 3. Moreover, while the chart discloses the following steps in a particular order, it will be appreciated that at least some of the steps can be moved, modified, or deleted where appropriate, consistent with the teachings of the present disclosure.

Method 300 begins with step S301, in which input module 202 receives a new chat message, as well as operation status of a target user device for a notification about the new chat message. If the operation status indicates that the user has accessed the new chat message (in step S302), method 300 can proceed to the end. On the other hand, if the operation status indicates that the user has not yet accessed the new chat message (in step S302), chat message processing module 204 can extract information content from the new chat message, in step S303. The extracted information content may include, for example, keywords and meta data of non-text data (e.g., image files, video files, audio files, etc.) or generated meta data or other descriptive data produced by computer analysis of such non-text data using technologies such as Computer Vision, Artificial Intelligence, and Machine Learning.

After the extracting of information content, interest determination module 206 can determine an interest score for a particular user, with the interest score representing a likelihood of the user's interest in the new chat message, in step S304. As discussed above, interest determination module 206 can access attribute information including a set of interested and disinterested keywords from user attribute database 212, and determine an interest score based on a degree of correlation between the extracted information content and the user attribute information. The interest score can also be determined based on a correlation between the extracted information content and a set of prior activities of the user accessed from user activity database 214. The interest score can also be determined based on whether the new chat message is a response to a new topic of discussion, based on prior chat message data stored in chat message database 210.

Moreover, interest determination module 206 can also determine an availability score of the user based on a model of the user's behavior predicted based on the user's prior activities from user activity database 214, in step S305. The availability score can reflect a likelihood of whether the user is available to access the new chat message.

After the interest score and the availability score have been determined, output module 208 can determine whether to output a notification (and the form of the notification) based on the interest score and the availability score, in step S306. As discussed above, output module 208 can access a set of rules for notification from notification configuration database 216. Output module 208 can also apply the set of rules to the interest score and the availability score, to determine whether to output a notification, and the form of the notification (e.g., an email notification, a pop-up notification, a ring tone, etc.). The determination can also be based on other factors, such as exceptions, effective durations, and whether the rules have been disabled by the users.

If output module determines that the interest score and/or the availability score satisfy the rules (in step S306), output module 208 may output a notification determined based on the interest score and the availability score, in step S307. On the other hand, if the interest score and the availability score do not satisfy the rules (and no applicable exceptions), output module 208 may withhold the notification, in step S308. Method 300 may then proceed to the end.

Figure 4:
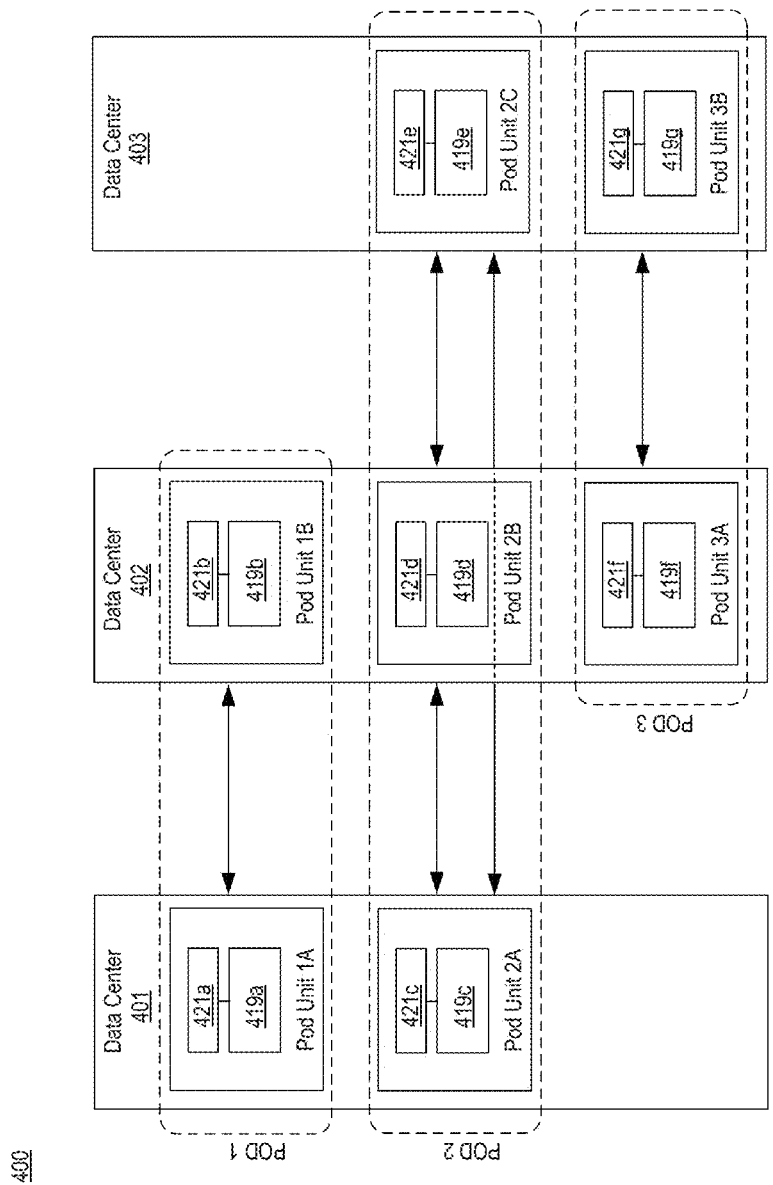
FIGS. 4 and 5 are component diagrams of an example of a communication system in which various implementations described herein may be practiced, consistent with disclosed embodiments.

FIG. 4 is a component diagram of an example of a communication system 400 in which various implementations described herein may be practiced, consistent with disclosed embodiments. Communication system 400 can be, for example, a telephony system such as a hosted Private Branch Exchange (PBX) platform that provides voice and video over IP, fax services, etc. Communication system 400 includes data centers 401, 402, and 403. Each data center is a point of presence (POP) that includes the network computing resources (e.g., servers, routers, switches, network connections, storage devices, etc.) for supporting the services provided by communication system 400. Each data center is typically located in a different geographical region.

In the depicted example, communication system 400 includes three user points of data (pods), i.e., pods 1, 2 and 3, each of which is a logical grouping of two or more pod units situated in different data centers. Each pod serves a different subset of user accounts. In this example, each pod unit (e.g., Pod Unit 2A) serves the same subset of users as the other pod units within the same pod (e.g., Pod Units 2B and 2C). Each pod unit includes a communication server 419a-419g configured to provide substantially the same services to the same subset of users as the other pod units within the same pod. Each pod unit also includes an account database 421a-421g configured to support the respective communication servers for the corresponding subset of users.

In some examples, components of communication system 400 can be used to implement computer programs, applications, methods, processes, or other software to perform the above-described techniques and to realize the structures described herein. For example, communication server 419a-419g can be used to implement the functionalities of, for example, server 108 (and chat service server 120b of chat application 120) of FIG. 1A. Moreover, account database 421a-421g can be used to provide account information of a user for determining a likelihood of the user's interest in a new chat message, and configuration information for outputting a notification specific for that user. The account database may include, for example, user attribute database 212, user activity database 214, and notification configuration database 216 of FIG. 2A.

Figure 5:
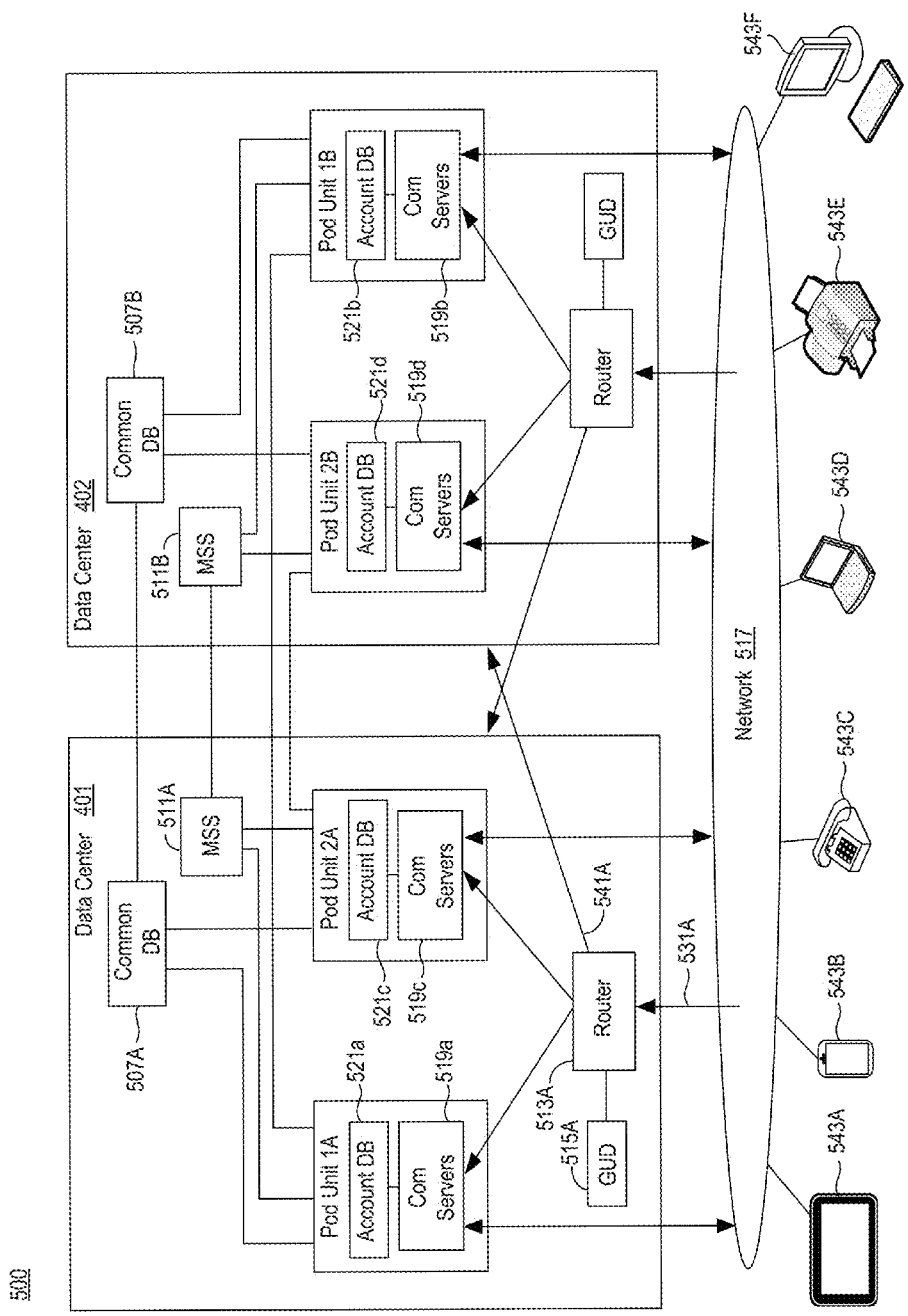

FIG. 5 is a component diagram of an example of a communication system 500 in which various implementations described herein may be practiced, consistent with disclosed embodiments. Specifically, FIG. 5 shows the various interconnections within and between data centers 401 and 402 of FIG. 4. Both data centers are in communication with network 517. Service requests from various communication devices 543A-543F are routed through network 517 to either or both of the data centers. Devices 543A-543F represent a diversity of client devices that connect with a services system designed in accordance with one or more implementations as described herein. Such client devices include, for example (and without limitation), cell phones, smart phones, tablets, laptop and desktop computers, conventional telephones, IP phones, teleconferencing devices, videoconferencing devices, set top boxes, gaming consoles, wearable computing devices, smartwatches, etc. Reference to specific client device types should therefore not be used to limit the scope of the present disclosure. In some examples, devices 543A-543F may represent user devices 102, 104, and 106 depicted in FIG. 1A, and can operate chat service client 120a of chat application 120.

Data center 501 includes pod units 1A and 2A, a common database (Common DB) 507A, a message storage system (MSS) 511A, a router 513A, and a global user directory (GUD) 515A. Additional pod units (not shown) may also be included in data center 401. Data center 402 is similarly configured and includes components that operate substantially the same as those in data center 401. Data centers 401 and 402 may provide backup and redundancy to one another in the event of failure.

Communication servers 519a-519c provide telecommunication services (e.g., voice, video, email, chat messaging, and/or facsimile) to corresponding subsets of users. Communication servers 519a-519c may include, for example, server 108 for a chat session, etc. Each server 519a-519c may also provide other services including, for example, user account management and configuration, billing services, accounting services, etc. Each pod unit includes an account database (Account DB) 521a-521c to support the communication server(s) for that particular pod unit, storing configuration details and other information regarding each user's account.

Pod Units 1A and 1B are in communication with one another so that the data on their respective account databases 521a-521c are synchronized across data centers. Data center 401 includes router 513A to receive an incoming service request 531A from network 517. The incoming service request may include, for example, a request to join a chat session, chat message data, and a request to update rules for outputting of notifications about new chat messages in the chat session. Router 513A parses the incoming service request to identify or extract a user key and queries GUD 515A to determine which pod is associated with the user key. Router 513A also routes the service request to the pod unit in the data center associated with the identified pod. If, for example, the pod unit associated with the identified pod is not associated with data center 401, router 513A routes the service request to another data center (e.g., data center 402 as indicated by the arrow 541A).

Each pod unit of the data center 401 is also coupled to MSS 511A which stores files for the users served by Pod Units 1A and 2A. These files may include, for example, messages (e.g., voicemails and facsimiles), user logs, system messages, system and user call prompts (e.g., auto-attendant or user-recorded greetings), and other types of call-related or electronic messages. These files may also include recording of the conference session. The contents of MSS 511A may be synchronized or combined with other data centers.

Each Pod Unit in data center 401 is coupled to common database 507A which stores shared data for all of the pods, and stores consolidated information from account databases 521a-521c. Common database 507A also facilitates changes to the pod databases. For example, common database 507A may store data for applications that provide the services on communication servers 519a-519c. Different versions of the applications data may be stored in common database 507A, allowing changes and upgrades to communication servers 519a-519c to be implemented efficiently and conveniently. Changes may be made to common database 507A and propagated to Pod Units 1A and 2A. Common database 507A is synchronized across data centers to other common databases (e.g., common database 507B of data center 602). Common database 507A, MSS 511A, router 513A, and GUD 515A form a common layer of resources that are shared by all pod units in data center 401.

Figure 6:
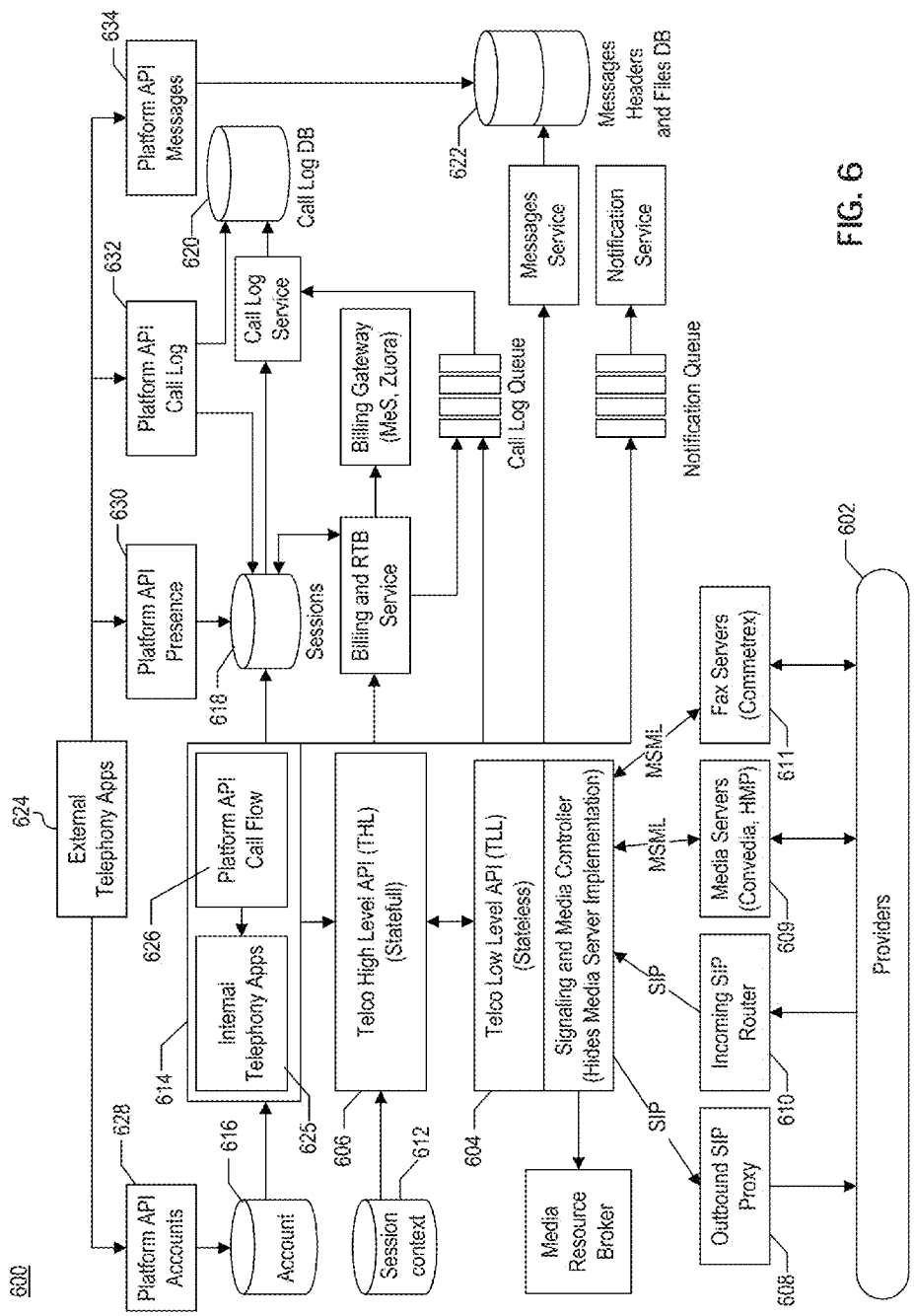
FIG. 6 is a component diagram of an example of a Private Branch Exchange (PBX) platform in which various implementations described herein may be practiced, consistent with disclosed embodiments.

FIG. 6 is a component diagram of an example of a Private Branch Exchange (PBX) platform in which various implementations described herein (e.g., communication systems 400 and 500 of FIGS. 5 and 6) may be practiced, consistent with disclosed embodiments. FIG. 6 depicts a PBX platform 600, which provides telephony services that allow communication among its users, and between its users and users associated with a variety of external telephony providers 602 via telecommunication APIs 604 and 606, outbound SIP proxy 608, and incoming SIP router 610. Media servers 609 and fax servers 611 provide functionality for processing voice over IP and fax over IP data, respectively. Telco low level API 604 is a stateless low-level API that provides signaling and media telephony primitives including, for example, call answering, placing of outbound calls, creation of conference call objects, addition of calls to conference call objects, playback of media for active calls, recording of active calls, etc. Telco high level API 606 is a higher-level API that has more sophisticated functionality such as, for example, interactive voice response (IVR), call forwarding, voice mail, chat messaging, etc. In the depicted implementation, telco API high level 806 doesn't have access to the PBX platforms databases, but maintains session context data of session context DB 612 to support its functionality. Telco high level API 606 may include function primitives which can be used to support the development of telephony applications. In some embodiments, telecommunication APIs 604 and 606 may provide at least some functionalities of server 108 of FIG. 1A.

Outbound SIP proxy 608 and incoming SIP router 610 employ SIP. SIP can be used for creating, modifying and terminating two-party (unicast) or multiparty (multicast) sessions, and may be one of the core protocols employed by systems configured as shown in and described above with reference to FIGS. 4 and 5. In some embodiments, outbound SIP proxy 608 and incoming SIP router 610 are used for transmitting signaling data with a conference client application.

The core functionality of PBX platform 600 (e.g., as described above with reference to FIGS. 4 and 5) is accessed via telephony services block 814 which has access (not entirely shown for clarity) to the various data repositories of PBX platform 600, e.g., account database (DB) 616, sessions DB 618, call log DB 620 and messages headers and files DB 622. Telephony services block 814 receives commands from telephony applications 824 and controls execution of the commands on the PBX platform 600. Telephony services block 614 can also include internal telephony applications 625 that are hosted and/or developed on or in connection with PBX platform 600. The depicted implementation also includes various APIs that allow external telephony applications 624 to interact with PBX platform 600. The APIs associated with PBX platform 600 allow telephony applications 624 and 625 to integrate with basic functionality of PBX platform 600 at multiple integration points, to control call flows during execution of the call flows by the platform (e.g., via API 626), and to access platform data (e.g., in DBs 616-622 via APIs 628-634).

Figure 7:
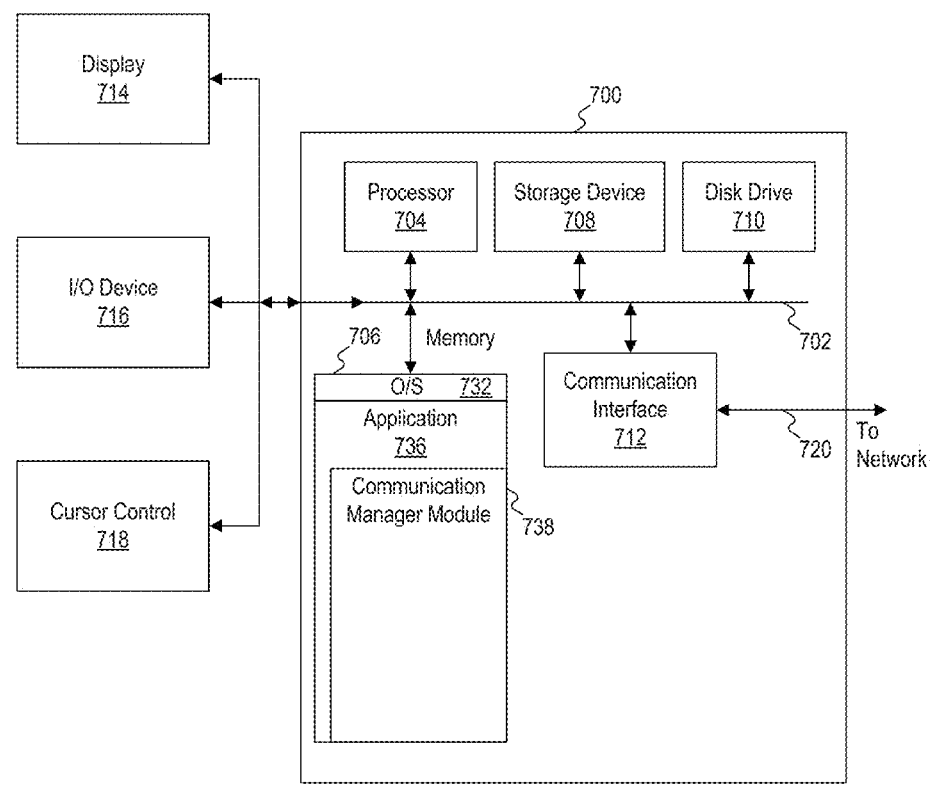
FIG. 7 is a component diagram of an example of a computer system with which embodiments described herein can be implemented, consistent with disclosed embodiments.

FIG. 7 is a component diagram of an example of a computer system with which embodiments described herein can be implemented, consistent with disclosed embodiments. FIG. 7 depicts a computer system 700. In some examples, computer system 700 can be used to implement computer programs, applications, methods, processes, or other software to perform the above-described techniques and to realize the structures described herein, such as user devices 102, 104, and 106, and server 108.

As shown in FIG. 7, computer system 700 includes a bus 702 or other communication mechanism for communicating information, which interconnects subsystems and devices, such as one or more processors 704, system memory ("memory") 706, storage device 708 (e.g., ROM), disk drive 710 (e.g., magnetic or optical), communication interface 712 (e.g., a modem, Ethernet card, or any other interface configured to exchange data with a communications network), display 714 (e.g., CRT or LCD), input device 716 (e.g., keyboard), and pointer cursor control 718 (e.g., mouse or trackball).

According to some examples, computer system 700 performs specific operations in which processor 704 executes one or more sequences of one or more instructions stored in system memory 706. Such instructions can be read into system memory 706 from another computer readable medium, such as static storage device 708 or disk drive 710. In some examples, hard-wired circuitry can be used in place of or in combination with software instructions for implementation. In the example shown, system memory 706 includes modules of executable instructions for implementing an operation system ("O/S") 732, an application 736, and a communication manager module 738, which can provide the functionalities disclosed herein. Application 736 may include, for example, chat application 120 of FIG. 2A, etc.

In some examples, execution of the sequences of instructions can be performed by a single computer system 700. According to some examples, two or more computer systems 700 coupled by communication link 720 (e.g., links to LAN, PSTN, or wireless network) can perform the sequence of instructions in coordination with one another. Computer system 700 can transmit and receive messages, data, and instructions, including program code (i.e., application code) through communication link 720 and communication interface 712. Received program code can be executed by processor 704 as it is received, and stored in disk drive 710, or other non-volatile storage for later execution.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method of facilitating a chat session, the method being performed on a device that provides the chat session and comprising:
   receiving chat data;
   predicting a likelihood of interest of the user in the chat data, the prediction being based on a model of the user's behavior and information reflecting an attribute and an availability associated with a user; and
   providing a notification to a device associated with the user based on the determined likelihood of interest.

2. The method of claim 1, further comprising:
   determining, based on the model, a first score associated with the chat data and the attribute, and a second score associated with the chat data and the availability;
   wherein the likelihood of interest is predicted based on the first and second scores.

3. The method of claim 2, wherein the first score is determined based on a measurement of semantic distance between the first set of keywords included in the chat data and a second set of keywords included in the attribute.

4. The method of claim 2, wherein the attribute includes information related to a set of prior activities of the user;
  wherein the first score is an aggregate score determined based on a weighted average of a set of scores, with each of the set of scores being determined based on a degree of correlation between the chat data and an activity of the set of prior activities;
  wherein a first weight associated with a first activity of the set of prior activities is higher than a second weight associated with a second activity of the set of prior activities;
  wherein the first weight and the second weight are set based on a timing relationship between the first activity and the second activity.

5. The method of claim 1, wherein the notification is also provided based on a determination of whether the chat data includes an identifier associated with the user.

6. The method of claim 1, wherein the availability is determined based on a history of usage of the device by the second user.

7. The method of claim 6, wherein the history of usage of the device comprises a history of the user accessing at least one of the chat session or another chat session.

8. The method of claim 6, wherein the history of usage of the device includes a history of chat data accessed by the second user;
  wherein the likelihood of interest is determined based on a relationship between the chat data and the history chat data.

9. The method of claim 1, further comprising:
  determining, based on the likelihood of interest and a set of rules, a configuration of the notification, wherein the configuration causes the device to generate a predetermined output to the second user.

10. The method of claim 9, further comprising: resetting the set of rules after a predetermined time period expires.

11. The method of claim 9, further comprising: resetting the set of rules after the chat session ends.

12. The method of claim 9, further comprising:
  receiving second chat data;
  determining a likelihood of relevancy of the second chat data to the chat data;
  after determining that the likelihood of relevancy is below a threshold, resetting the set of rules.

13. The method of claim 1, wherein the chat data is received from a sender device; further comprising:
  providing an indication that reflects the indication of interest of the user to the sender device.

14. The method of claim 13, further comprising:
  providing the indication to a second device other than the sender device.

15. The method of claim 13, further comprising:
  predicting a likelihood of interest of a second user in the chat data;
  determining an indication based on the likelihood of interest of the second user; and
  providing the indication to the sender device.

16. A non-transitory computer-readable medium storing instructions that are executable by one or more processors of a device that provides a chat session to cause the device to perform a method for facilitating the chat session, the method comprising:
  receiving chat data;
  predicting a likelihood of interest of the user in the chat data, the prediction being based on a model of the user's behavior and information reflecting an attribute and an availability associated with a user; and
  providing a notification to a device associated with the user based on the determined likelihood of interest.

17. The non-transitory medium of claim 16, wherein the method further comprises:
  determining, based on the model, a first score associated with the chat data and the attribute, and a second score associated with the chat data and the availability;
  wherein the likelihood of interest is predicted based on the first and second scores.

18. The non-transitory medium of claim 17, wherein the first score is determined based on a measurement of semantic distance between the first set of keywords included in the chat data and a second set of keywords included in the attribute.

19. The non-transitory medium of claim 17, wherein the attribute includes information related to a set of prior activities of the user;
  wherein the first score is an aggregate score determined based on a weighted average of a set of scores, with each of the set of scores being determined based on a degree of correlation between the chat data and an activity of the set of prior activities;
  wherein a first weight associated with a first activity of the set of prior activities is higher than a second weight associated with a second activity of the set of prior activities;
  wherein the first weight and the second weight are set based on a timing relationship between the first activity and the second activity.

20. An apparatus for conducting a chat session, comprising:
  one or more memories having stored thereon computer-executable instructions; and
  one or more hardware processors configured to execute the stored instructions to:
  receive chat data;
  predict a likelihood of interest of the user in the chat data, the prediction being based on a model of the user's behavior and information reflecting an attribute and an availability associated with a user; and
  provide a notification to a device associated with the user based on the determined likelihood of interest.

* * * * *